United States Patent [19]

Nystrom

[11] Patent Number: 5,251,860

[45] Date of Patent: Oct. 12, 1993

[54] INTERFACE ADAPTER

[75] Inventor: Robert E. Nystrom, Woodbridge, Va.

[73] Assignee: The United States of America as represented by the Secretary of the Army, Washington, D.C.

[21] Appl. No.: 843,028

[22] Filed: Feb. 28, 1992

[51] Int. Cl.$^5$ .............................................. A47K 1/08
[52] U.S. Cl. .................... 248/313; 354/293; 248/316.1
[58] Field of Search ............... 248/316.1, 316.5, 316.8, 248/313, 231, 230, 74, 74.2, 74.3; 354/293

[56] References Cited

U.S. PATENT DOCUMENTS

| | | | |
|---|---|---|---|
| 1,503,083 | 7/1924 | Amey et al. | 248/316.1 X |
| 1,540,758 | 6/1925 | Burke, Jr. | 248/313 |
| 2,346,200 | 4/1944 | Tinnerman | 248/74.3 X |
| 2,684,020 | 7/1954 | Kellner | 354/293 X |
| 2,756,956 | 7/1956 | Anderson | 354/293 X |
| 2,915,799 | 12/1959 | Andreasen | 248/313 |
| 2,936,992 | 5/1960 | Browning | 248/313 |
| 3,414,221 | 12/1968 | Nelson | 248/316.8 X |
| 3,817,435 | 6/1974 | DeLuca et al. | 248/313 X |
| 3,913,876 | 10/1975 | McSherry | 248/74.3 |
| 4,213,592 | 7/1980 | Lingenfelser | 248/313 |
| 4,676,472 | 6/1987 | Kamrud, Sr. | 248/74.1 X |
| 4,766,651 | 8/1988 | Kobayashi et al. | 248/74.3 X |

*Primary Examiner*—David A. Scherbel
*Assistant Examiner*—Korie H. Chan
*Attorney, Agent, or Firm*—Alain L. Bashore; Milton W. Lee; Anthony T. Lane

[57] ABSTRACT

An interface adapter assembly for adaptably mounting observation equipment. An adapter plate assembly and shield base assembly adaptably mount the observation equipment to an attached mounting. A shield assembly is provided that is coupled to the shield base assembly which protects what is mounted on the shield base assembly.

1 Claim, 3 Drawing Sheets

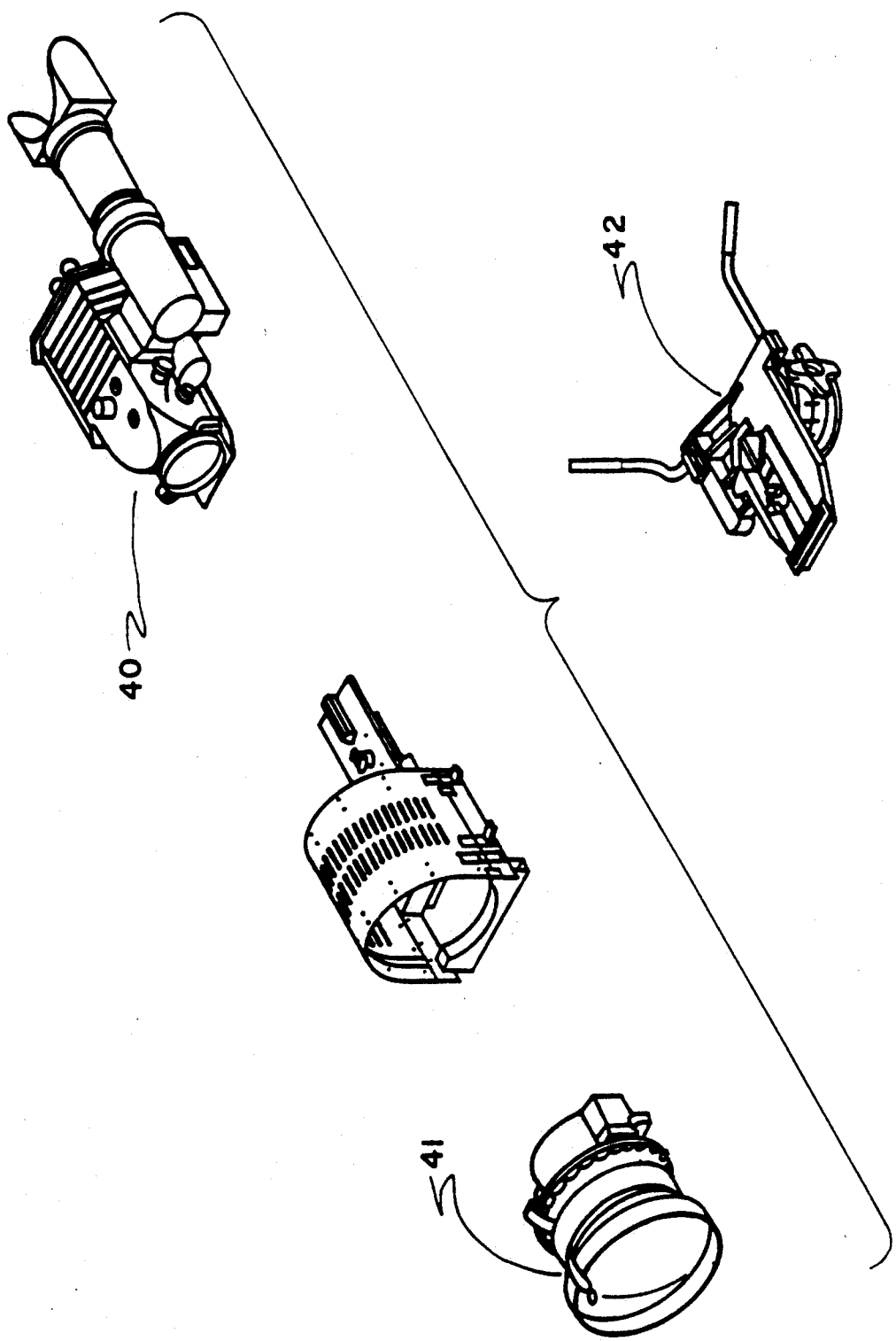

INTERFACE ADAPTER

BACKGROUND OF INVENTION

1. Field of the Invention

The field of the invention disclosed herein is directed to interface adapters and more specifically interface adapters for adaptably mounting and protecting observation equipment.

2. Description of Related Prior Art

In the prior art there is a known problem that observation equipment require a stable interface adapter from which to be used. That stability must be maintained even when that observation equipment changes in design, or when attachments are interfaced to that equipment. Considerations such as mechanical support and the importance of proper weight distribution are known for the design of conventional mounts such as a conventional camera tripod. The present invention overcomes this problem in the prior art by providing an interface adapter that provides proper mechanical support, proper weight distribution, and protection.

SUMMARY OF THE INVENTION

The invention disclosed herein is directed to an interface adapter for adaptably mounting observation equipment and protecting the lens assembly of the equipment to be mounted. The adapter includes an adapter plate assembly and hinged shield base assembly. The adapter plate assembly includes a top and bottom plate releasably coupled in offset relationship, each of which is adapted to mate and couple the equipment to be mounted from above for the top plate, and the interface adapter to mate and couple to a mounting surface to the bottom plate. The hinged shield base assembly includes a rectangular frame arrangement including support members and yoke members such as to be adapted to cradle the lens assembly for stability to further secure the observation equipment. A hinged shield cover coupled to the base assembly which protects the lens assembly of the observation equipment mounted on the shield base assembly.

The primary objective of this invention is to provide an interface adapter assembly, for adaptably mounting observation equipment, which provide proper mechanical support, proper weight distribution, and protection.

BRIEF DESCRIPTION OF THE DRAWINGS

A full and complete understanding of the invention can be obtained from the following detailed description of the invention when read in conjunction with the annexed drawing in which:

FIG. 4 shows an exploded view of the observation equipment and mounting means for the preferred embodiment of the present invention.

PREFERRED EMBODIMENTS

Figure 1:
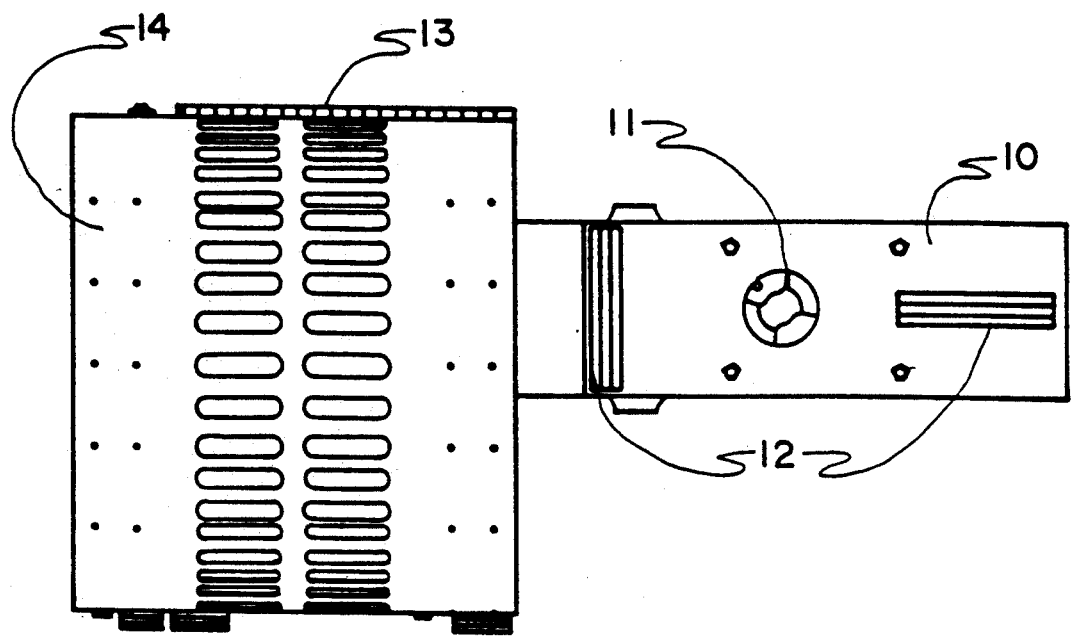
FIG. 1 shows a top view of the interface adapter assembly.
Figure 2:
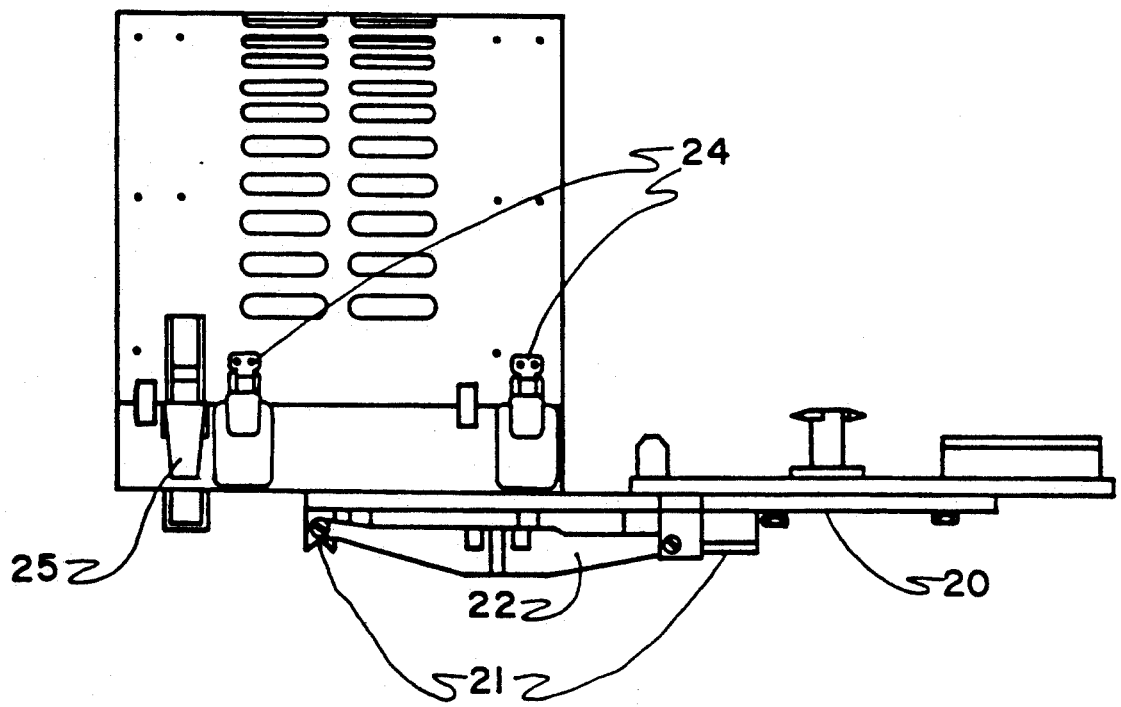
FIG. 2 shows a side view of the interface adapter assembly.
Figure 3:
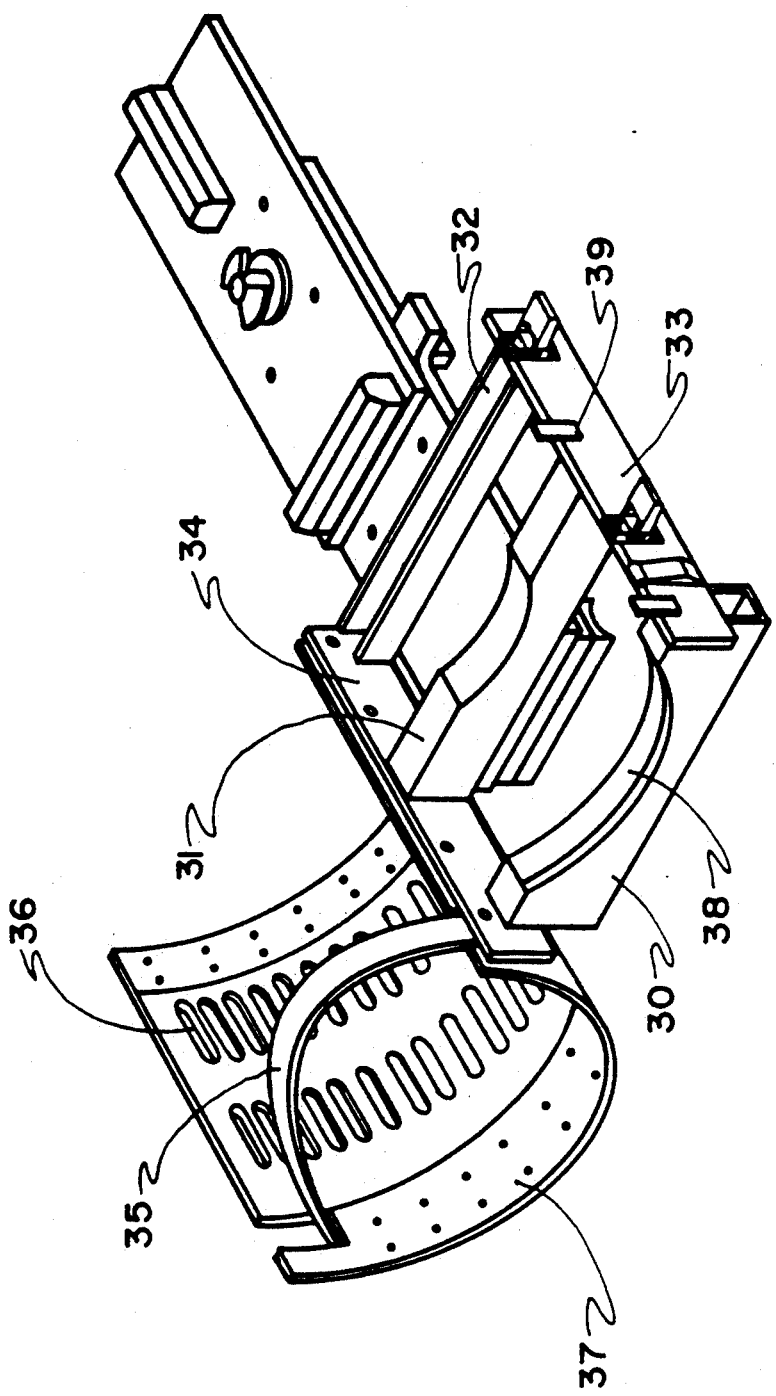
FIG. 3 shows a pictorial view of the interface adapter assembly with open shield cover.

The interface adapter assembly of the present invention includes an adapter plate assembly and shield assembly best shown in FIGS. 1 and 2, and a shield base assembly best shown in FIG. 3.

In FIG. 1 there is shown a plate assembly which includes a top plate 10 with a top surface. On the top surface of top plate 10 there is mounting means that mechanically secure the observation equipment to top plate 10 and alignment means which specifically align the equipment. In the preferred embodiment, the mounting means consist of cam post 11 which allows for mounting of equipment by mechanical coupling shown as the campost protrusions and campost shaft in FIGS. 1, 2, and 3. The alignment means consist of V-Way interface mounting blocks 12 which function to mate with and couple a piece of equipment to a mounting structure for stabilization purposes, as shown in FIG. 4.

A bottom plate 20, shown in FIG. 2 includes a top surface which is attached to the bottom surface of top plate 11 in an offset relationship along the same longitudinal center axis as shown in FIGS. 2 and 3. The preferred embodiment has the attachment made by bolts, but it is understood that any releasable attachment means may be used. On the bottom surface there is also mounting and alignment means which function similarly to those disclosed for top plate 10. In the preferred embodiment, the mounting means to mount the assembly to an attached mounting means consist of mounting structural member 22 while the alignment means consist of V-Way interface mounting blocks 21, the same as blocks 12 of FIG. 1.

While there has been disclosed a preferred embodiment of means for mounting means and alignment means of the observation equipment to plate 10 and plate 20, it is understood that the invention is not limited to those means disclosed above. These means are understood to be specific to the type of equipment used.

Both top plate 10 and bottom plate 20 combine to increase the effective length of support for the observation equipment which position the center of gravity for mounting interface 22 in relation to the complete interface adapter. Proper mechanical support and weight distribution result from the present invention. An effective mounting by use of the present invention allows for the equipment to be supported such that the equipment is freely movable and stays in a horizontal plane while adjusting for level and elevation.

A shield base assembly shown as a rectangular frame arrangement in FIG. 3 additionally supports a front end of observation equipment to be mounted. Center yoke member 31 is attached to the top surface of top plate 10 of FIG. 1 and front yoke member 30 is an additional support point for the observation equipment. Center yoke member 31 and end yoke member 32 additionally support the overall base assembly, and each is parallel to center yoke 30. A right support member 33 and left support member 34 are perpendicular to and connected to the front yoke 30, center yoke member 31 and end yoke 32, all of which may be structurally reinforced. A shock absorbing material 38 is attached to front yoke member 30 to absorb shocks that the equipment may be subjected to. In the preferred embodiment a rubber material may be used.

The shield base assembly is attached at the center yoke member 31 and end yoke member 32 to a forward portion of the top surface of bottom plate 20 of FIG. 2. The preferred embodiment has the attachment made by bolts, but it is understood that any releasable attachment means may be used. An equipment restraining strap 35 shown in FIG. 3 additionally secures and restrains the equipment mounted on the shield base assembly by attachment of one end to left support member 34 and the other end held by a spring loaded adjustable latch 25 in FIG. 2. The effective length of strap 35 can then be adjusted depending on the type of equipment to be mounted.

The shield assembly shown in FIGS. 1, 2, and 3 provide protection for that part of the observation equipment that is mounted on the shield base assembly. As shown in FIG. 1, there is a shield cover 14 which is attached to left support frame 34 of FIG. 3 by a hinge 13 in FIG. 1. While the preferred embodiment discloses a hinge, it is understood that any similar means to allow ease of removal and replacement of the observation equipment under shield cover 14 may be used.

Shield holes 36 shown in FIG. 3 lightens the overall weight of cover 14 and allows for reinforcement bands 37 to be attached to the inside front and back edge of cover 14 to structurally strengthen shield cover 14. While any attachment means may be used, the preferred embodiment utilizes welding or riveting to attach reinforcement bands 37. Guides 39 allow for cover 14 to align for a close fit against right support frame 33. Catches 24 shown in FIG. 2 is the preferred embodiment for releasably securing cover 14 to the shield base assembly.

The interface adapter assemblies is also designed to function without a cover in place. If the cover 14 must be removed, strap 35 will secure the equipment to the base assembly for continued use.

While there has been disclosed on preferred embodiment in the drawing figures as to a specific shape of the shield cover 14, it is understood that the specific shape of shield cover 14 is not limited to that disclosed. The type of observation equipment used could necessitate a different shape or a flexible material, as long as the shield cover functions in part to protect the equipment mounted underneath.

FIG. 4 shows the interface adapter assembly with optical equipment and mounting means of the preferred embodiment. Optical equipment shown in FIG. 4 include a night sight 40 and extended lens assembly 41. Mounting means shown is adjustable mounting assembly 42. Adjustable mounting assembly may be mounted on physically stationary objects such as a tripod, or on a movable object such as a vehicle. This preferred embodiment is not intended to restrict the invention to the precise embodiment or embodiments described.

I claim:

1. An interface adapter for adaptably mounting observation equipment and protecting the lens assembly thereof, comprising:

an adapter plate assembly including a top and bottom rectangular plate releasably coupled in offset relationship along longitudinal center axis, said top plate including mounting means on the top of said top plate to mate and couple the equipment being mounted, and whereby the bottom of said bottom plate is adapted to mate and couple the interface adapter to a mounting surface on a support structure;

a shield base assembly having a rectangular frame arrangement including two parallel longitudinal support members at least three yoke members connected to said rectangular frame arrangement between said longitudinal support members, said yoke members being in parallel with each other and in a perpendicular relationship to the two parallel longitudinal support members, whereby the rectangular frame arrangement is adapted to be coupled to the top side of the bottom plate such that the lens assembly is cradled in the yoke assembly for stability, and a hinged shield assembly coupled to said rectangular frame arrangement whereby the hinged shield assembly functions to protect the lens from a hostile environment;

a securing means releasably coupled to said longitudinal support members for releasably holding the equipment to be mounted against the shield base assembly whereby observation equipment is mounted with sufficient mechanical support and weight distribution such as to be freely movable and stay in a horizontal plane while adjusted for level and elevation, and sufficient protection achieved for the lens assembly from a hostile environment.

* * * * *